(12) United States Patent
Frantz et al.

(10) Patent No.: US 6,736,051 B2
(45) Date of Patent: May 18, 2004

(54) FLOATING CLAMSHELL GRIDDLE TOASTER

(75) Inventors: Howard Jay Frantz, Irvine, CA (US); John James Boyer, Yorba Linda, CA (US)

(73) Assignee: In-N-Out Burgers, Irvine, CA (US)

( * ) Notice: Subject to any disclaimer, the term of this patent is extended or adjusted under 35 U.S.C. 154(b) by 20 days.

(21) Appl. No.: 10/141,378

(22) Filed: May 8, 2002

(65) Prior Publication Data

US 2003/0051605 A1 Mar. 20, 2003

Related U.S. Application Data

(60) Provisional application No. 60/323,470, filed on Sep. 18, 2001.

(51) Int. Cl.[7] .................................................. A47J 37/06
(52) U.S. Cl. .............................. 99/349; 99/353; 99/379; 99/422
(58) Field of Search .......................... 99/349, 353, 379, 99/377, 380, 381, 422, 397, 398, 424

(56) References Cited

U.S. PATENT DOCUMENTS

| | | |
|---|---|---|
| 2,225,068 A | 12/1940 | Marriott |
| 3,126,813 A | 3/1964 | Marriott |
| 3,611,913 A | 10/1971 | McGinley |
| 3,712,207 A | 1/1973 | McGinley et al. |
| 4,241,650 A * | 12/1980 | John et al. .................... 99/372 |
| 4,261,257 A | 4/1981 | Henderson et al. |
| 4,577,092 A | 3/1986 | Lenoir |
| 4,729,296 A | 3/1988 | Sabin |
| 5,197,377 A * | 3/1993 | Jennings et al. .......... 99/379 X |
| 5,755,150 A | 5/1998 | Matsumoto et al. |
| 5,931,083 A | 8/1999 | Stanger et al. |
| 5,948,301 A | 9/1999 | Liebermann |
| 5,960,704 A | 10/1999 | March et al. |
| 6,016,741 A | 1/2000 | Tsai et al. |
| 6,153,244 A | 11/2000 | Stanger et al. |
| 6,171,630 B1 | 1/2001 | Stanger et al. |
| 6,192,789 B1 | 2/2001 | Agcaolli et al. |

* cited by examiner

*Primary Examiner*—Reginald L. Alexander
(74) *Attorney, Agent, or Firm*—Edward O. Ansell

(57) ABSTRACT

A device for simultaneously and evenly toasting articles of differing contours and dimensions arranged upon a heated griddle. A clamshell plate, positioned in stand-off relationship above said griddle-arranged articles, has a plurality of slideably moveable fingers or pins mounted therein which float, that is, are brought into contacting and resting relation with the upper surfaces of said articles to provide a gentle pressure thereon to urge the lower surfaces into more intimate contact with the griddle until the toasting process is completed, thereby accelerating the toasting process without undesirable side effects such as distortion of, and condensation on, the upper surfaces and caramelization of the lower surfaces of said articles.

15 Claims, 4 Drawing Sheets

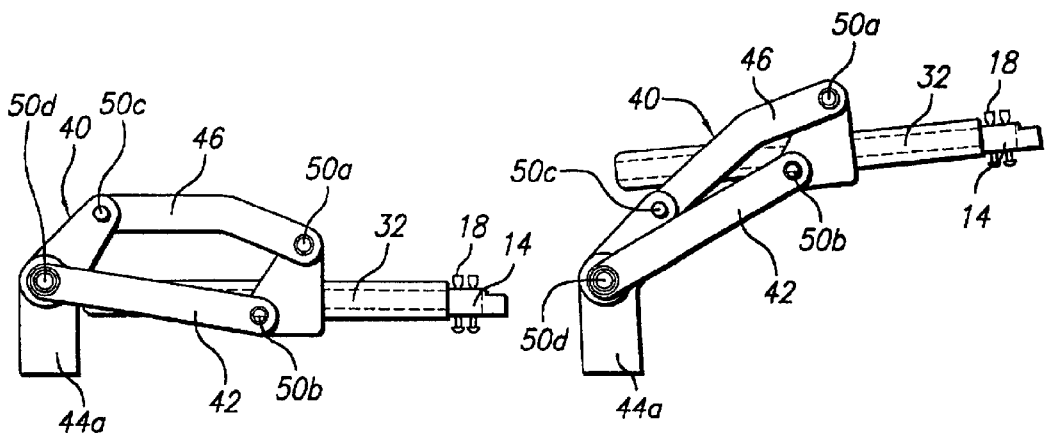
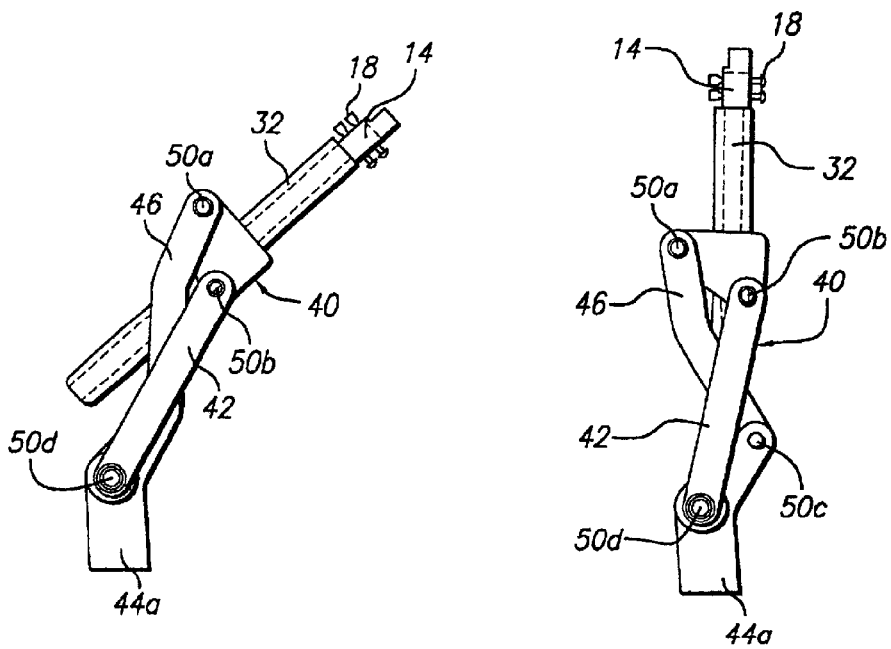
FIG. 6 FIG. 7
FIG. 8 FIG. 9

FLOATING CLAMSHELL GRIDDLE TOASTER

CROSS-REFERENCE TO RELATED INVENTIONS

Continuation-in-part of Ser. No. 60/323,470, filed Sep. 18, 2001, the contents of which are incorporated by reference.

STATEMENT REGARDING FEDERALLY SPONSORED RESEARCH OR DEVELOPMENT

Not Applicable

MICROFICHE APPENDIX

Not Applicable

BACKGROUND OF THE INVENTION

This invention relates to an improved toasting apparatus, particularly suited for use in a fastfood restaurant operation for the toasting of buns. In the 1950's most buns were toasted by placing them face down on a flat griddle. They absorbed the heat radiated off the griddle surface, and were toasted in about four to six minutes. Subsequent decades brought mechanized bun toasters of two basic types. The first is radiant toasters (e.g., home toasters) which utilize heat elements that never directly touch the bun, but toast through radiant heat transfer. Modern commercial radiant toasters utilize a conveyor belt to allow quicker processing of buns. A second type of toaster is the contact toaster, which uses a conveyor to run a bun over a hot surface. These toasters use an opposing surface to compress the bun and get good contact of the lower surface of the bun with the hot surface.

While both radiant and contact toasters allow quicker and easier toasting, they do not impart the same quality of toast as the old fashioned method of placing buns on a flat griddle. Quality oriented fast-food restaurants continue to use the old fashioned toasting method because of the flavor and texture it imparts to the bun. However, most contact toasters use pressure to accelerate the toasting process, typically, by using an opposing plate to compress the bun. The disadvantages of this method include distortion of the shape of the bun by compressing it at its highest points, and allowing condensation to form on the top surface of the bun, which changes texture.

The prior art discloses contact toasters wherein weights are placed upon the bun surface opposite the surface placed upon a griddle to be toasted. Relevant prior art includes U.S. Pat. No. 2,225,068, Bun Toasting Machine, issued Dec. 17, 19940, and U.S. Pat. No. 3,126,813, Self-Adjusting Weights for Toasting Machine, issued Mar. 31, 1964.

Each of these references discloses weights arranged on conveyor chains which move buns forward along a toasting plate. In U.S. Pat. No. '068, FIGS. 4 and 5, the weights are seen to be discs said to be ⅔ the diameter of the bun, the curvature of the plurality of discs conforming "approximately to the average curvature of the top of the bun". U.S. Pat. No. '813 discloses chain-suspended weights which are self-adjusting to the extent of accommodating themselves to articles of variable size, shape or thickness as articles are conveyed across a toasting plate. The weights are formed in roughly a "U" shape with a flat bottom of approximately four square inches between an upwardly curved front wall and an upwardly extending rear wall, with a central cut-out portion so as to be formed with side suspension arms having apertures to receive a hinge shaft transversely connected to the conveyor chains. When then the weight is hanging freely from the hinge shaft, the bottom wall is positioned in a substantially horizontal plane.

The weights described in the references are for use with conveyor contact toaster systems. In each of the patents, the weights are such that the bun is conformed to the shape of the weight. Sliding the bun surface across the toasting griddle tends to promote caramelization. Caramelization is defined as the process of changing the sugar content of a food into caramel, an amorphous brittle brown and somewhat bitter substance, by heating sugar, thereby changing bun texture as well as taste. Further, the large contact surface of the weights disclosed present a relatively large surface area thus being susceptible to condensation which wets the upper surface of the bun and changes the texture thereof. Further, for a given "footprint," the space necessarily dedicated to the conveyor mechanism leaves much less working space.

It is, therefore, an object of the present invention to provide improved weighted means which can exert downward pressure on articles being toasted, and which are self-adjusting to the extent of accommodating themselves to contours and dimensions of articles of said various sizes, shapes or thickness.

It is another object of this invention to provides a means of simultaneously and uniformly toasting articles of differing contours and dimensions without distortion of the upper surface contour thereof, while avoiding the caramelization of the article surface contacting the griddle;

It is a further object of the present invention to provide a maneuverable and compact apparatus having a minimum "footprint" for use at cooking stations where space is limited.

And yet another object is to provide improved weights for a clamshell griddle toaster which will float upon and exert downward pressure on the upper surface of articles being toasted, which will be self-adjusting to the extent of accommodation to articles of varying dimensions and contours as placed upon the griddle, and which will present a minimal surface area for collection of condensation as an incident of the toasting operation.

BRIEF SUMMARY OF THE INVENTION the present invention relates to a method and apparatus for simultaneously and evenly toasting articles of differing shapes and sizes on a flat metal surface griddle. By way of example, a hamburger bun is sliced horizontally through its midsection, the top potion hereinafter being identified as the "crown," and the lower portion as the "heel." The apparatus comprises a hinged clamshell plate perforated with a multitude of passageways, into each of which is slideably arranged an improved weighted finger or pin, which plate can be lowered over a griddle surface to a position whereby each finger, moving independently, floats, i.e., rests upon, and places a gentle pressure upon the upper surface of the articles arranged upon the griddle, such as bun crowns and heels, irrespective of their differing contours.

It is a feature of the present invention that, in operation, the clamshell plate containing the improved weighted fingers from a generally vertical disengaged position travels downwardly, in an arcuate clockwise path, transitioning to a generally horizontal orientation parallel to the plane of the griddle, whereupon the plate continues its decent in a vertical path to a stand-off position above the griddle. The small, weighted fingers are lowered gradually from the clamshell plate and rest on the bun surface. Each finger moves independently and places a small weight on the bun portions. The sum of many fingers provides a gentle pressure on the bun upper surfaces which accelerates the toasting process without distorting the shape thereof and, because of the configuration of the bun-touching finger ends, a minimal area is presented for the collection of condensation. Thus, improvement of toasting speed and quality are achieved without the negatives of other toasting methods. When the toasting process is completed, the clamshell lid is raised, and the bun portions can be removed. New bun portions are then added to the griddle and the process is repeated. It has been found that the Floating Clamshell Bun Toaster speeds up the toasting process by 40 to 50% while imparting the same flavor and texture as the old fashioned flat griddle toasting technique.

BRIEF DESCRIPTION OF THE SEVERAL VIEWS OF THE DRAWINGS

FIG. 6 illustrates the clamshell plate at its lowest and horizontal position;

FIG. 7 shows the clamshell plate in a substantially horizontal position as it begins its vertical upward ascent;

FIG. 8 illustrates the clamshell plate in its counter-clockwise upward travel;

FIG. 9 shows the clamshell plate in its substantially vertical position;

DETAILED DESCRIPTION OF THE INVENTION

Figure 1:
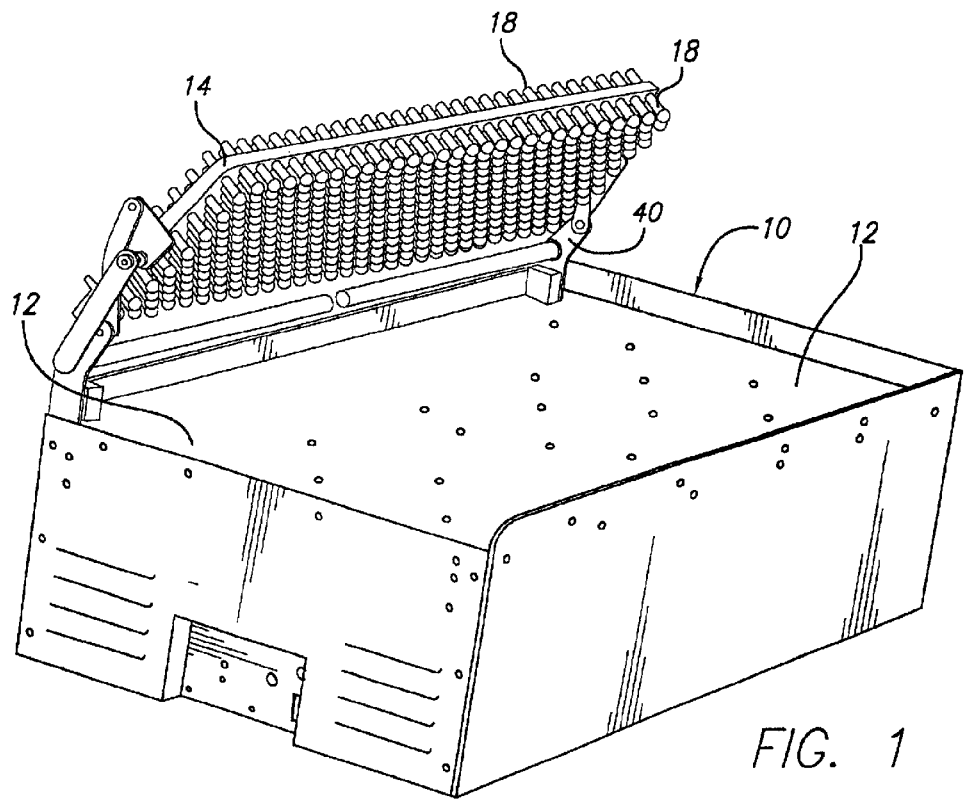
FIG. 1 is a perspective view of the griddle toaster of the present invention.
Figure 5:
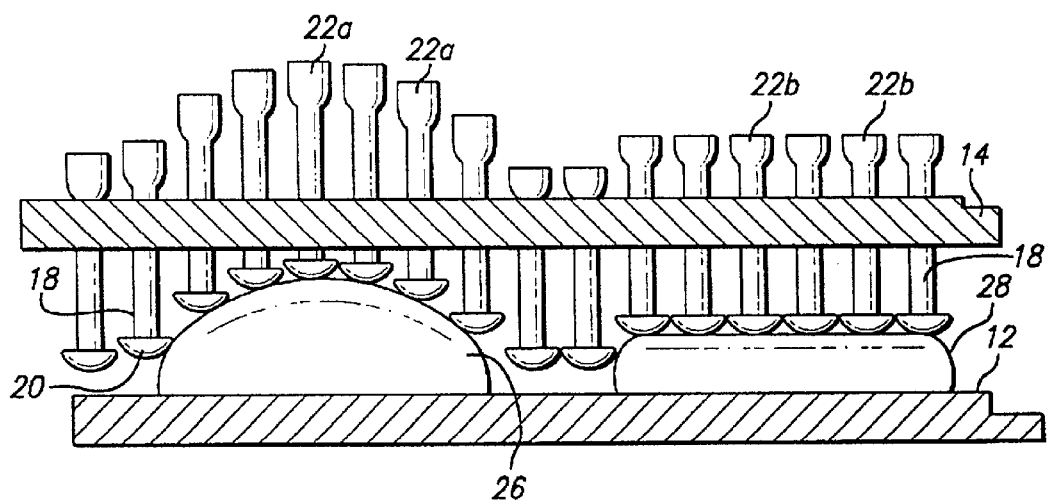
FIG. 5 is a partial front view of the clamshell plate, taken along section line 5—5 of FIG. 4, showing pins positioned upon bun crowns and heels.

Referring to FIG. 1, the present invention relates to a toaster apparatus 10 for simultaneously and evenly toasting articles of differing shapes and sizes, such as sliced portions of a hamburger bun, on a heated flat metal surface, i.e., griddle 12, more particularly to toast the inside surfaces of a cut hamburger bun in an even manner in as short a time as possible. As shown in FIG. 5, to aid in this process, means are provided for applying gentle pressure to the top surfaces of the bun crown 26 and heel 28 to ensure that the crown and heel undersides are in intimate contact with the griddle surface 12. The apparatus 10 comprises a hinged clamshell plate 14 perforated with a multitude of passageways 16, into each of which are slideably arranged improved pins 18, said clamshell plate 14 adapted to being raised above or lowered to a stand-off position in proximity to the heated griddle surface 12 whereby each pin 18, moving independently floats, that is, rests and places a gentle pressure upon the upper surface of articles arranged upon the griddle, irrespective of the article's contour.

The toaster 10 has a plate or griddle 12 upon which crowns 26 and heels 28 of the sliced bun are placed to be toasted. The griddle plate 12 is manufactured from a high strength aluminum alloy which is hard-anodized to give the cooking surface 12 superior wear characteristics and excellent heat-transfer capacity. The toaster is heated by electric heater plates (not shown) and enclosed with stainless steel covers and a "belly guard" to prevent accidental contact with the griddle plate 12.

Figure 3A:
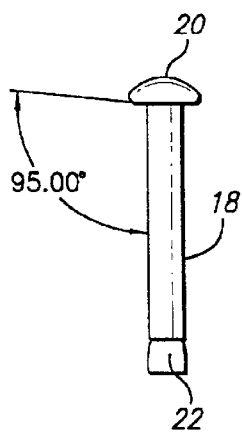
FIG. 3A is a front view of the improved pin.
Figure 3B:
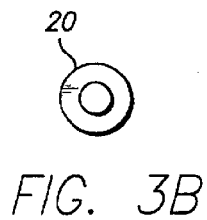
FIG. 3B is a top view of a pin.
Figure 3C:
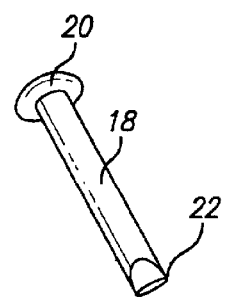
FIG. 3C is a pictorial view of a pin, showing the formed end and the flattened end.
Figure 2:
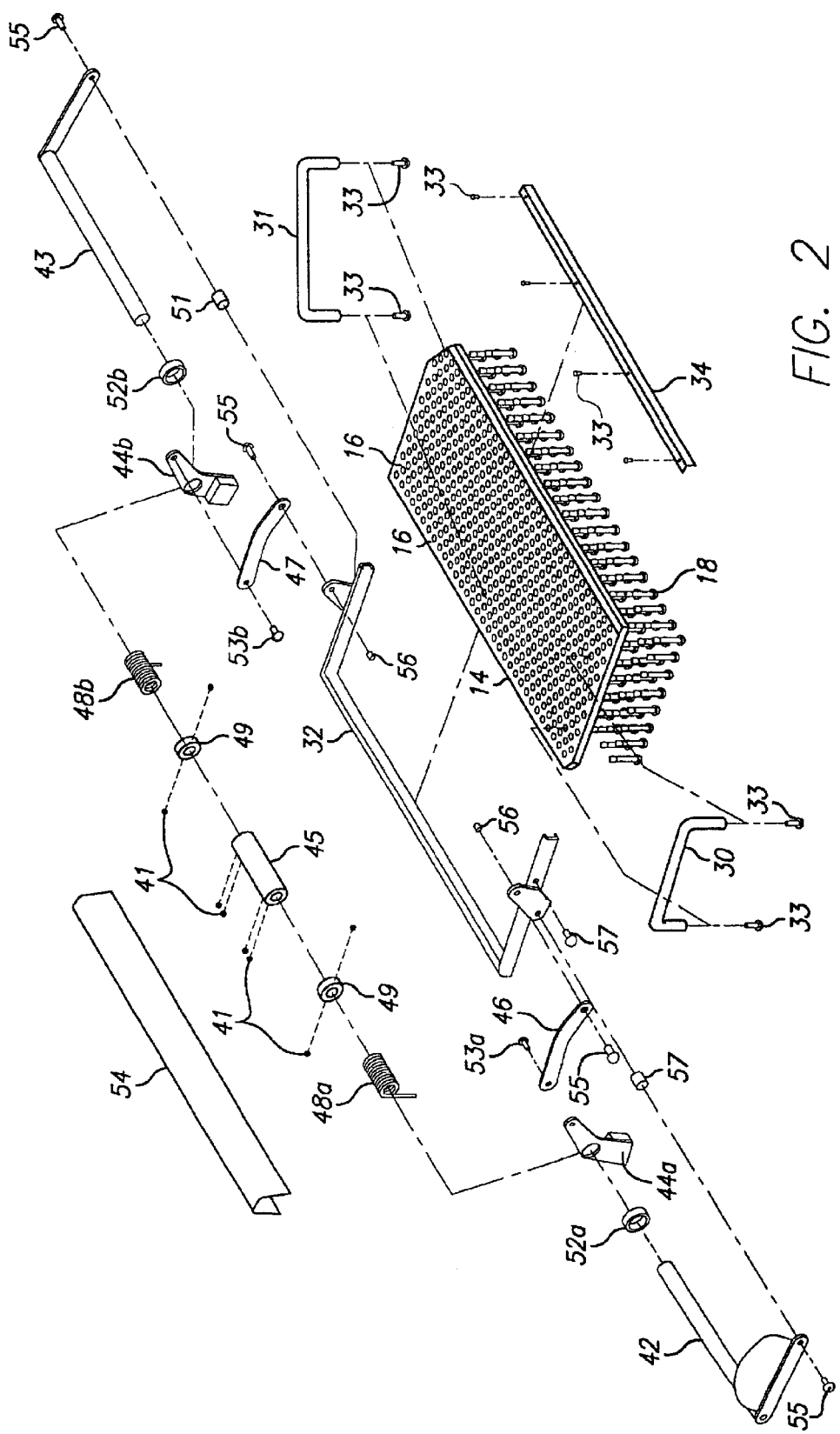
FIG. 2 is an exploded view assembly drawing of the clamshell plate and associated mechanism.
Figure 4:
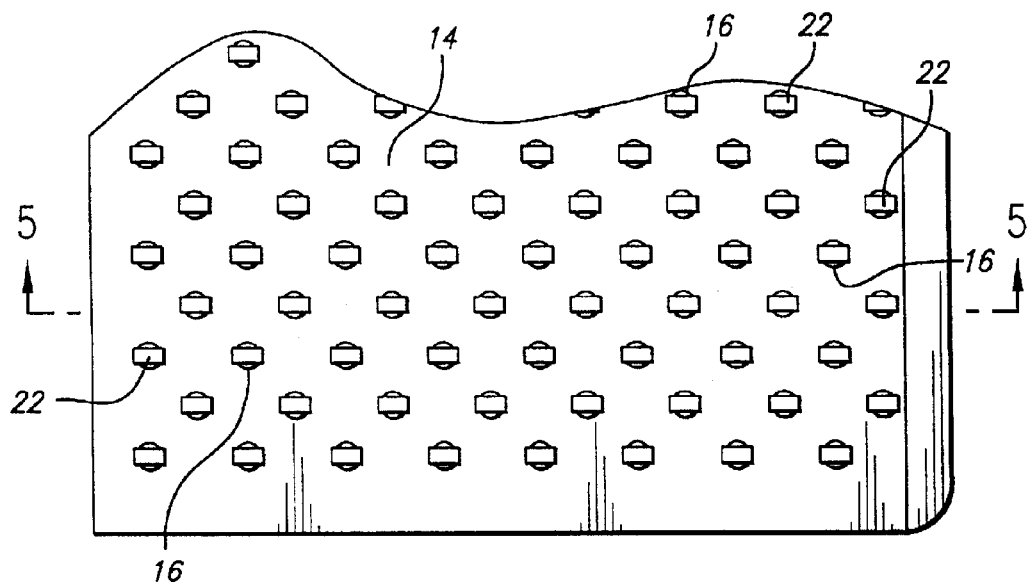
FIG. 4 is a partial to view of the clamshell plate with improved pins positioned therein.

Referring to FIG. 2, the pin plate 14 is manufactured from acetal homopolymer material, noted for low friction, low moisture absorption and dimensional stability. A series of passageways 16 in a regular pattern with one inch spacing are drilled through the plate 14. Into these holes are inserted the fingers 18 in the form of pins, manufactured from 5052 Aluminum alloy with a clear anodize finish for corrosion resistance. The design of the pin, best shown in FIGS. 3A, 3B, and 3C features multiple radii at the formed end 20, so the pins do not mark the buns during initial contact or withdrawal. FIG. 4 shows the positioning of the pins 18 within the passageway 16 of the plate 14, with the formed rounded ends 20 extending downwardly. The other ends of the pins 22 are flattened to two different heights 22a, 22b, shown in FIG. 5, to allow for the different thickness between the top and bottom halves of the buns 26, 28. The pins 18 are thus free to move up and down in their respective passageway 16 as they come into contact with the upper surfaces of the buns, applying pressure without damaging the delicate baked surface. In the preferred embodiment, four hundred eighty six (486) pins 18 were deployed within a plate surface area 14 of approximately two hundred eighty four (284) square inches, a ratio of 1.7 plus pins per square inch. While the ratio of number of pins per unit of plate area may vary, the useful range varies from one (1) pin per square inch (for large buns) to three (3) pins per square inch for smaller buns.

As further illustrated in FIG. 2, two handles 30, 31 are furnished to facilitate attachment and removal of the pin plate 14 for cleaning. The pin plate 14 is mounted into a frame assembly 32, reinforced by a supporting angle 34, which is constrained by four arms arranged in pairs evenly about the centerline of the frame 32. The lever arms 42, 43 guide the lower side of the frame 32 and also provide a counter balancing force through two torsion springs 48a, 48b associated with spring collars 49. A tubular connector 45, held in place with setscrews 41 to ensure equal movement of both arms in unison, joins the lever arms 42, 43. The connecting arms 46, 47 guide the top of the frame 32. The lever and connecting arms 42, 43, 46, 47 are connected to the frame assembly 32 by shoulder bolts 55 passing through bushings 51, secured by locking pins 57, capped by dome nuts 56 and are attached to a pair of support bracket 44a, 44b through bushings 52a, 52b and secured by shoulder bolts 53a, 53b, said support brackets providing the lower pivot points 50d.

The normal operation of the pin plate mechanism 40 is to rotate the pin plate 14 clockwise using the attached handle 30. The initial rotation is rapid until the plate 14 is at approximately 45° to the horizontal when the speed of rotation decreases. When the plate reaches approximately two inches above a lower stop position, the movement becomes largely vertical. At a position approximately one inch from the lower stop position the formed ends 20 of the bun pins 18 float, i.e., make contact with and rest upon the upper surfaces of the bun halves 26, 28, causing the bun pins 18 to slide upwardly through the bun plate 14. As the plate continues to move towards its lowest horizontal position the weight of the bun pins 18 is brought fully to bear on the bun halves 26, 28 thereby pressing the lower surfaces fully against the grill surface 12 to ensure quick and even toasting.

Referring to FIGS. 2 and 6–9, the geometry of the pin plate mechanism 40 is such that the length of the connecting arms 46, 47 is shorter than the length of the lever arms 42, 43. Also, the position of the pivot points 50a for the connecting arms 46, 47 and the position of the pivot points 50b for the lever arms 42, 43 on the frame 32 are offset both horizontally and vertically. Similarly, the position of the pivot points 50c for the connecting arms 46, 47 and the position of the pivot points 50d for the lever arms 42, 43 on the support brackets 44a, 44b are offset both horizontally and vertically. This arrangement constrains the movement of the frame 32 and also the griddle plate 14 so that from the lowest position (FIG. 6) for the first two inches of upward movement the frame 32 and plate 14 remain largely horizontal (see FIG.7). In the preferred embodiment, when the frame 32 and plate 14 reach a height of three inches they start to rotate anti-clockwise, as viewed in FIG. 8. The anti-clockwise rotation continues slowly until such time as an imaginary line drawn through the centerline of the lever arm 42 passes above the support bracket connecting arm pivot 50c. At this point, the speed of rotation increases considerably such as the final fifteen degrees of rotation of the lever arm generates forty-five degrees of rotation of the frame 32 and plate 14. As shown in FIG.9, at the end of travel the frame 32 and plate 14 are in a substantially vertical position. Mechanical stops (not shown) are positioned to limit arc of travel to required positions. And, as illustrated in FIG.1 the pin plate mechanism 40 is mounted onto and above the griddle plate 12. As seen in FIG. 2, a cover 54 is provided to protect the moving parts of the mechanism and screws 33 connect the handles 30, 31 and the supporting angle 34 to the frame 32. The pin plate 14, pin plate mechanism 40 and cover 54 are all removable for cleaning without the use of tools, a requirement for regulatory approval.

While the preferred embodiment of the invention has been shown and described, it will be apparent to those skilled in the art that changes and modifications may be made thereto without departing from the spirit of the invention, the scope of which is defined by the appended claims.

What is claimed is:

1. In a bun toasting machine of the character described having a toasting plate adapted to be heated and to receive bun halves thereon, the improvement comprising: means for carrying slideable weights arranged above said to toasting plate, said weights adapted to float on top of said bun halves and keep said bun halves pressed against said toasting plate, said weights comprising pins positioned in passageways within said carrying means, said pins having means on opposite ends thereof to retain said gins within said carrying means, said means to retain said pins within said carrying means comprising a rounded portion at the pin ends floating on the top of said bun halves and a flattened portion at the opposite pin ends, whereby the configuration of said plurality of weights floating on top of each of said bun halves conforms approximately to the curvature of the top surface of each of said bun halves.

2. A bun toasting machine as described in claim 1 and, in addition, means for positioning said carrying means in a standoff relationship to said toasting plate.

3. In a bun toasting machine of the type described having a heatable toasting plate adapted to receive bun segments thereon, the improvement comprising: means for carrying slideable weights arranged above said toasting plate, said weights being adapted to float upon the upper surfaces of said bun segments and thereby keep the lower surface of said bun segments pressed against said toasting plate, said floating weights comprising pins having rounded ends at one extremity thereof adapted to bear in touching relationship with the upper surfaces of said bun segments arranged upon said toasting plate, said pin rounded ends having a cross-sectional area at each point of contact with said upper surface of said bun segment less than the cross-sectional area of the pin of which it is a part, whereby the configuration of said plurality of weights floating upon the upper surface of each of said bun halves conforms approximately to contour of each bun segment upon which it bears.

4. In combination with a heated griddle plate for toasting the lower surface of articles of varying upper contours, the improvement comprising:
   a plate member having a plurality of passageways extending vertically therethrough
   a plurality of pins adapted to slide within said passageways, and positioned therein, said pins extending beyond the surfaces of said plate member and haying a rounded end portion and a flattened end portion, both larger in dimension than the diameter of said passageways, thereby limiting the extent of travel of each pin within its respective passageway;
   and means for positioning said plate member in generally horizontal stand-off relation above said griddle, the rounded end portions of said pins facing said griddle, whereby said pins slide downwardly within their respective passageways to engage in floating relationship with the upper contours of the articles to be toasted.

5. A bun toasting machine as described in claim 4 wherein the ratio of the number of pins to square inch of plate member surface area is approximately 1.71.

6. A bun toasting machine as described in claim 4 wherein the ratio of the number of pins to square inch of plate member surface area is approximately 1.0 to approximately 3.0.

7. A bun toasting apparatus of the type described, comprising:
   a griddle plate adapted to be heated from its underside and to receive bun halves on the upper surface thereof;
   a pin plate having a plurality of passageways extending vertically therethrough from the upper to lower surfaces thereof
   a plurality of pins adapted to slide within said passageways, said pins extending beyond the surfaces of said pin plate, each having rounded and flattened end portions thereof larger in dimension than the diameter of said passageways to limit the extent of pin travel therein;
   means for positioning said pin plate from a generally vertical disengaged position with respect to said griddle plate to travel downwardly in an arcuate clockwise path to transition to a generally horizontal orientation parallel to the plane of the griddle, descending vertically to a stand-off position above said griddle plate, the rounded end portion of said pins facing said griddle; whereby said pins slide downwardly within their respective passageways to engage the upper surfaces of said bun halves in a floating, weight-bearing relationship in accordance with the contours of the upper surfaces of said bun halves, thereby enhancing the contact of lower surfaces of said bun halves with said griddle plate.

8. A bun toasting machine as described in claim 7 wherein the ratio of the number of pins to square inch of plate member surface area is approximately 1.71.

9. A bun toasting machine as described in claim 7 wherein the ratio of the number of pins to square inch of plate member surface area is approximately 1.0 to approximately 3.0.

10. A bun toasting apparatus of the type described, comprising:

a griddle plate adapted to be heated from its underside and to receive bun halves on the upper surface thereof;

a pin plate having a plurality of passageways extending vertically therethrough from the upper to lower surfaces thereof;

a plurality of pins positioned to slide and positioned within said passageways, said pins extending beyond the surfaces of said pin plate, each having rounded and flattened end portions thereof larger in dimension than the diameter of said passageways to limit the extent of pin travel therein; the rounded end portion of said pins extending from the lower surface of said pin plate;

means for positioning said pin plate from a generally vertical disengaged position with respect to said griddle plate to travel downwardly in an arcuate clockwise path to transition to a generally horizontal orientation parallel to the plane of the griddle, descending vertically to a stand-off position above said griddle plate;

whereby said pins slide downwardly within their respective passageways to engage the upper surfaces of said bun halves in weight-bearing relationship in accordance with the contours of the upper surfaces of said bun halves, thereby enhancing the contact of lower surfaces of said bun halves with said griddle plate.

11. A bun toasting apparatus as set forth in claim 10 wherein the ratio of the number of pins to each square inch of pin plate surface area is approximately 1.71.

12. A bun toasting apparatus as set forth in claim 10 wherein the ratio of the number of pins to each square in of pin plate surface area is approximately 1.0 to approximately 3.0.

13. A bun toasting apparatus of the type described according to claim 10 wherein said means for positioning said pin plate comprise:

a // frame into which said plate is mounted, said frame having an upper side lower side and two lateral sides;

first and second connecting arms and first and second lever arms, said connecting arms being shorter in length than said lever arms;

said first connecting arm and said first lever arm being pivotally attached on a first lateral side and above the centerline of said frame, said second connecting arm and said second lever arm being attached on the opposite lateral side and evenly with said first connecting and lever arms connection above the centerline of said frame, the positions of the pivot points for the connecting arms and the lever arms on the lateral frame sides being offset horizontally and vertically;

a first torsion spring connected to said first lever arm an1 a second torsion spring connected to said second lever arm;

a tubular connector joining said first and second lever arms through said torsion springs;

a first support bracket to which the first connecting arm is pivotally attached and said first lever arm is pivotally attached; and a second support bracket to which said second connecting arm is pivotally attached and said second lever arm is pivotally attached, the positions of the pivot points for the connecting arms and the lever arms on the respective support brackets being offset horizontally and vertically;

whereby said lever arms guide the travel of the lower side of said frame and provide a counter-balancing force through said torsion springs, said tubular connector ensuring equal movement of said lever arms in unison, and said connecting arm guide the travel of the upper side of the frame thereby enabling said pin plate to travel downwardly, from a generally vertical disengaged position with respect to said griddle plate, in an arcuate clockwise path to transition to a generally horizontal orientation parallel to the plane of the griddle, descending vertically to a stand-off position above said griddle plate.

14. A toasting apparatus comprising:

a heatable platform for receiving articles which are to be toasted;

a plurality of spaced-apart pin means for imparting compressive forces through a rounded terminus thereof;

means for positioning said force imparting means over a given area of said in fleeting touching relationship with the upper contour of said articles arranged upon said heatable platform;

said heatable platform, said spaced-apart force imparting means and said positioning means together defining a space open to the ambient;

whereby condensation of moisture upon the article to be toasted is inhibited.

15. A toasting apparatus as described in claim 14 wherein the ratio of the number of spaced-apart pin means for imparting compressive forces to each square inch of heatable platform area upon which articles to be toasted are received is approximately 1.0 to approximately 3.0.

* * * * *